United States Patent
Rezzoug et al.

(10) Patent No.: US 12,492,829 B1
(45) Date of Patent: Dec. 9, 2025

(54) INDIRECT EVAPORATIVE COOLING AND FOUR SIDES SUB-WET BULB CELL (4SSBC) FOR OUTDOOR EVAPORATIVE COOLING STRUCTURES

(71) Applicant: IMAM MOHAMMAD IBN SAUD ISLAMIC UNIVERSITY, Riyadh (SA)

(72) Inventors: Aissa Rezzoug, Riyadh (SA); Rashid Khan, Riyadh (SA); Nashmi Alrasheedi, Riyadh (SA); Omar Eid Almutairi, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/017,248

(22) Filed: Jan. 10, 2025

(51) Int. Cl.
*F24F 1/0358* (2019.01)
*F24F 1/028* (2019.01)

(52) U.S. Cl.
CPC ............ *F24F 1/0358* (2019.02); *F24F 1/028* (2019.02)

(58) Field of Classification Search
CPC ................................ F24F 1/0358; F24F 1/028
USPC ......................................................... 165/47
See application file for complete search history.

(56) References Cited

U.S. PATENT DOCUMENTS 5,301,518 A * 4/1994 Morozov .............. F24F 1/0035
261/153
2014/0183764 A1 7/2014 Gilbert

FOREIGN PATENT DOCUMENTS

| CN | 105222260 B | 12/2017 |
| CN | 112082235 A | 12/2020 |
| WO | 2018/046979 A1 | 3/2018 |

* cited by examiner

*Primary Examiner* — Steve S Tanenbaum
(74) *Attorney, Agent, or Firm* — Oblon, McClelland, Maier & Neustadt, L.L.P.

(57) ABSTRACT

The Four Sides Sub-Wet Bulb Cell (4SSBC) is an innovative evaporative cooling system designed for outdoor environments, particularly in dry and hot regions. Unlike conventional indirect evaporative cooling systems, which typically rely on two-sided heat exchange, the 4SSBC introduces a four-sided heat exchange process. This unique configuration significantly enhances cooling efficiency while reducing water consumption. The 4SSBC utilizes porous materials, including ceramics and synthetic media, for optimized heat and mass transfer. Furthermore, the 4SSBC is designed to be integrated into decorative cooling structures for recreational outdoor spaces, providing a more comfortable environment for occupants. The system ensures that fresh air is produced without excessive humidity, offering a sustainable and efficient solution for outdoor comfort in recreational areas during night time.

15 Claims, 8 Drawing Sheets

Cooling cell design from prior art
(solution rejected)

FIG. 2B

Cooling cell design from prior art
(interesting approach but needs improvement)

FIG. 3

Nomenclature and symbolization on two cooling cells' junction

Section D-D: part of the wall seen from outside the cooling structure (see View 1 in FIG. 0)

FIG. 6

INDIRECT EVAPORATIVE COOLING AND FOUR SIDES SUB-WET BULB CELL (4SSBC) FOR OUTDOOR EVAPORATIVE COOLING STRUCTURES

BACKGROUND

Technical Field

The present disclosure is directed to evaporative cooling systems, and more particularly to an improved indirect evaporative cooling system employing, e.g., a four-sided heat exchange configuration for enhanced cooling efficiency. It could be used in indoors or outdoors, however in the present disclosure the application is focused on its usage for outdoor for soothing the outdoor nighttime environment in the recreation areas.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Climate change is causing record-high temperatures, particularly in urban areas, leading to uncomfortable and sometimes unhealthy outdoor environments. This situation has increased the demand for energy-efficient cooling solutions to make outdoor spaces more enjoyable. According to recent climate studies and health organization reports, regular physical activity and outdoor social interaction are essential for maintaining public health and well-being [*World Health Organization.* (1823). *Physical activity*]. However, rising global temperatures, particularly in urban areas [*AR6 Climate Change* 1821*: The Physical Science Basis—IPCC*; Lowe, S. A. (1816). *An energy and mortality impact assessment of the urban heat island in the US. Environ. Impact Assess. Rev.* 1816, 56], have made it increasingly challenging to utilize outdoor recreational spaces during peak temperature periods. This situation has created an acute need for effective cooling solutions that can make outdoor spaces more enjoyable while maintaining sustainability.

Overall variation in global temperatures and increasing energy demands are pushing the scientific community to provide environmentally friendly, sustainable, and cost-effective solutions for controlling ambient conditions, especially for the occupants' comfort in outdoor conditions. This requirement becomes crucial in regions with dry and hot conditions. Due to extreme weather conditions, a huge budget is consumed in operation and maintenance of high-powered conventional cooling systems especially designed for outdoor social activities. Furthermore, they contribute significantly to greenhouse effect by producing unwanted emissions. In view of these constraints, scientists and researchers are constantly striving to develop alternative efficient and low-powered systems.

Traditional approaches to outdoor cooling have historically relied on methods such as awnings, shade sails, and natural vegetation. Modern research has further focused on developing evaporative cooling systems as an energy-efficient alternative to traditional air conditioning. Evaporative cooling systems represent a key technology for providing thermal comfort in outdoor and semi-outdoor spaces, particularly in regions characterized by hot and dry climatic conditions [Evans, J. M., & Braun, J. E. (1807). *A performance-based evaluation of indirect evaporative cooling systems in hot and dry climates. Building and Environment,* 42(8), 2949-2959; Naylor, S., Baran, G., Melikov, A., & Popiolek, Z. (1815). *Effectiveness of natural ventilation, evaporative cooling and mechanical ventilation in hot arid climates. Energy and Buildings,* 88, 55-63]. These systems operate by harnessing the natural cooling effect produced when water evaporates into air, offering an energy-efficient alternative to conventional air conditioning systems for large open spaces.

In recent developments, direct evaporative cooling systems have been employed. In general, the process of evaporating water into the surrounding air and lowering its temperature is known as direct evaporative cooling. These systems operate by passing hot air through a wetted medium to achieve cooling through water evaporation. These systems mainly include porous ceramic material, such as soil, celdek paper, or fired clay, as an evaporative cooling medium [Lee, K. H., & Choi, Y. S. (2020). *Experimental investigation of evaporative cooling using porous ceramic plates. Energy Procedia,* 178, 105-112; Li, H., Guo, F., Zhou, Y., & Shao, L. (1818). *A review on recent developments for porous ceramic membranes with the use of starch as pore former. Advances in Materials Science and Engineering,* 2018, 1-9]. While direct evaporative cooling systems provide some relief, they suffer from inherent limitations in their cooling capability and efficiency. A significant drawback is their inability to achieve sub-wet bulb temperatures, which limits their cooling potential. Additionally, these systems often result in increased humidity levels that can create discomfort for occupants.

This has inspired a number of researchers to investigate indirect evaporative cooling systems in order to reach sub-wet bulb temperature, also known as dew point. In related technologies, the hot and dry air stream in this configuration is divided into a cold but dry stream and a wet channel stream. The dry channel inlet air partially exchanges heat with the water stream by transferring its heat through a thin, non-permeable channel wall. This process indirectly cools the air in the dry channel. A fraction of this cool air is redirected to the wet channel in order to reach sub-wet bulb temperature, known as rejected humid air. This process also cools the wet channel water stream by evaporating the fraction of water from the surface. However, these systems still face challenges in achieving sufficient heat transfer efficiency and reducing water consumption while maintaining structural integrity and durability.

Based on the advantages and demand of Indirect Evaporative Cooling Systems (IECS), huge efforts have been made by the researchers to enhance their efficiency. The research mainly concluded that an evaporative cooler may reduce the ambient temperature by 5 to 15 degrees Celsius, while performing more efficiently than conventional systems [He, J., & Hoyano, A. (1811). *Experimental study of the performance of indirect evaporative cooler using porous ceramic heat exchanger. Building and Environment,* 46(1), 105-113]. Since standard IECS have dual heat exchanging sides, an increment in thermal efficiency has limits, which constrains their overall performance. The limitations of existing solutions have created a need for improved cooling technologies that can effectively address the growing challenges of urban heat stress while maintaining energy efficiency and environmental sustainability.

There are few reported patents related to the indirect cooling system. For instance, US1840183764A1 discloses an incoming air flow directed through dry passages of a heat exchanger. Upon exiting the dry passages, the air stream is divided into supply air and return air that is re-directed into the wet passages.

Furthermore, CN112082235 discloses a partition member between a dry channel and a wet channel. A heat exchange baffle is provided between the wet channel and the output air channel. The partition member adopts a corrugated plate with a ventilation structure. However, this is a 2-sided configuration with limited heat exchange efficiency.

WO1818046979A1 discloses an evaporative cooling apparatus where outside air enters a dry channel having heat transfer contact with a wet channel through a wetted surface. The system incorporates a turbine powered by the outside air, with the exhaust air directed to the wet channel for evaporative cooling. The working air becomes humidified with moisture from the evaporative liquid. Indirect heat exchange increases the temperature and the moisture content of the working air in its headway updraft from the low elevation to the high elevation in the wet channel. However, this configuration exhibits thermal efficiency limitations due to restricted heat exchange surface area and non-uniform temperature distribution along the flow path.

CN105222260B describes a multi-channel cooling system where outdoor air is divided into parallel paths entering multiple wet and dry channels. The system implements a two-stage cooling process where air discharged from initial channels serves as inlet air for secondary cooling stages through a diverter box arrangement. The principle of working of this reference is that wet filler is used in direct, indirect evaporative cooling technology, to reach the purpose of air temperature reduction. The complexity and multiple stage requirements of this system result in increased pressure drops and reduced overall thermal efficiency.

Each of the aforementioned references suffers from one or more drawbacks hindering their adoption, particularly achieving desirable cooling efficiency while maintaining structural simplicity and operational reliability. The prior systems generally require complex channel arrangements or multiple cooling stages to achieve desired temperature reductions, leading to increased system complexity and maintenance requirements. Additionally, conventional systems often exhibit limitations in heat exchange effectiveness due to restricted contact area between the primary air flow and cooling surfaces.

Accordingly, it is one object of the present disclosure to provide a cooling system for improved evaporative cooling that can provide enhanced cooling performance through efficient heat exchange configurations while maintaining structural and operational simplicity and integrity. The cooling system of the present disclosure aims to improve the thermal transfer capabilities between primary and secondary air streams along the flow path circumference.

SUMMARY

In an exemplary embodiment, a cooling system includes a heat exchange wall separating a primary air channel and a working air channel that are arranged in parallel; a plate positioned on an end of the heat exchange wall; and a partition wall positioned and separating the secondary air channel and working (wet) air channel that are arranged in parallel and communicated at the second side plate. The primary air channel is surrounded 360 degrees by the heat exchange wall which is surrounded by the wet passage by more than 350 degrees.

In some embodiments, the cooling system has a first side fluidly connected to a first space and a second side fluidly connected to a second space, the plate is positioned at the second side, the partition wall extends from the first side towards the second side and is spaced apart from the plate, and the cooling system further comprises a silica gel layer directly applied on the wall of primary air channel to glue metal conductive plate with the porous structural ceramic.

In some embodiments, the partition wall defines the secondary air flow path along the secondary air channel from the first side to the second side and then along the working (wet) ais channel from the second side to the first side, the wet passage is positioned between the heat exchange wall and the partition wall.

In some embodiments, the cooling system includes a plurality of the heat exchange walls surrounded 360 degrees by the wet passage, and the plurality of the heat exchange walls each define a respective primary air channel surrounded 360 degrees by the wet passage.

In some embodiments, the cooling system further includes a respective primary air inlet, for each primary air channel, positioned on the first side and configured to receive a primary air from the first space; and a respective primary air outlet, for each primary air channel, positioned on the second side and configured to discharge the cooled primary air into the second space.

In some embodiments, the cooling system further includes valves positioned on the first side plate and each configured to open and close a respective primary air outlet.

In some embodiments, the cooling system further includes a secondary air inlet positioned on the first side and configured to receive a secondary air from the first space, wherein the heat exchange wall is configured to receive water for the secondary air to generate evaporative cooling for the primary air and to form a cooled primary air and an exhaust air containing moisture; and a secondary air outlet positioned on the first side and configured to discharge the exhaust air into the first space.

In some embodiments, the first space is an outdoor space, the second space is an indoor space, and the primary air and the secondary air both include ambient air from the outdoor space.

In some embodiments, the cooling system further includes primary fan 185 configured to deliver the primary air to the primary air inlet and deliver the secondary air to the secondary air inlet.

In some embodiments, the cooling system further includes a water condensation pipe configured to collect the moisture from the working (wet) air.

In some embodiments, the cooling system further includes a water supply mechanism positioned in the wet passage and configured to spray water onto the heat exchange wall.

In some embodiments, when viewed from the first side towards the second side, the plurality of the heat exchange walls each has a square shape, the wet passage has a U-shape for each cell (for two adjacent cells, the wet passage surrounds completely the primary air channel).

In some embodiments, the cooling system further includes a primary air inlet positioned on the first side and configured to receive a primary air from the first space. A secondary air inlet positioned on the first side and configured to receive a secondary air from the first space, wherein the heat exchange wall is configured to receive water for the working air to generate evaporative cooling for the primary air and to form a cooled primary air into the second space.

In some embodiments, the heat exchange wall is surrounded 360 degrees by the wet passage.

In some embodiments, when viewed from the first side towards the second side, the dry cooling passage has a rectangular shape having four sides surrounded by the wet passage.

In some embodiments, the heat exchange wall is impermeable to air and moisture.

In some embodiments, the heat exchange wall includes a first thermally conductive layer comprising a metal and a second porous layer including at least one porous material selected from the group consisting of cellulose, a polymer and a ceramic, the first thermally conductive layer faces the primary air channel, and the second porous layer faces the working air channel.

In some embodiments, the cooling system further includes a divider (partition) wall dividing the secondary air flow path into separate paths and dividing the wet channel into separate channels, wherein when viewed from the first side towards the second side, the dry cooling passage is surrounded by the wet passage by more than 350 degrees, and the dry cooling passage is surrounded by the wet passage and the divider wall by 360 degrees.

In some embodiments, the cooling system further includes a water supply channel configured to provide water along the divider wall and the heat exchange wall.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a cooling system that integrates innovative heat exchange principles with efficient moisture control mechanisms to achieve enhanced cooling performance. The cooling system of the present disclosure implements a geometric configuration that increases thermal transfer surface area while maintaining desirable flow dynamics, resulting in superior cooling efficiency compared to conventional approaches. The proposed configuration of the cooling system provides comprehensive thermal interaction between primary and secondary air streams through an expanded interface geometry, fundamentally improving ability of the system to achieve and maintain target temperature differentials.

Figure 1A:
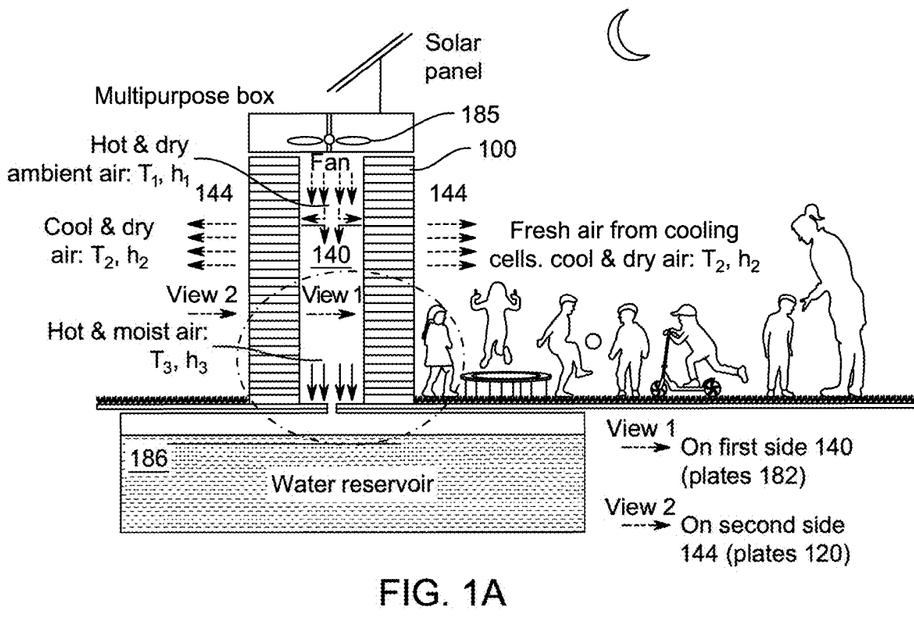
FIG. 1A is an exemplary schematic diagram of cooling structure built by cooling cells in its environment

FIG. 1A represents the schematic of design of the cooling structure comprise of cooling cells to provide a soothing environment to the indoor space. It is noted that the indoor space is in front of the second side, as illustrated using view 2 in FIG. 1A. While the outdoor space represents area from where the primary air flows by fan in front of side one, as mentioned by view 1 in FIG. 1A. The walls of the structure are built with cooling cells. The upper section consists of multipurpose box and solar panels. The multipurpose box has Air Handling Unit (AHU) and batteries as energy storing device, connected with solar system. Furthermore, the box is designed in such a way that allows unidirectional air flow (from top to bottom). This enhances the overall efficiency of the cooling structure. The prime objective of the solar equipment is to store enough energy for operating the fan throughout the peak evening hours of cooled air requirement, so there will be no other conventional energy source is required. The fan produces primary air, having temperature $T_1$ and humidity $h_1$, that goes into the cooling cell. In the cooling cell there are two passages, first one converts primary air into output air by reducing its temperature to $T_2$. While the second, called working air, goes through the recycling condensation pipes and evacuate in the reservoir, placed under the cooling structure, as mentioned in FIG. 1B. The temperature and humidity, $T_3$ and $h_3$, of working air become higher than primary air while exiting the cooling cell. The purpose of the reservoir is to supply required amount of water to the cooling cells in order to make them moist or wet. It also receives the recycled water transported by the working air through water condensation pipes. This may enhance sustainability of the system by reducing the overall consumption of water. The preceding discussion is related to the overall cooling system, however, the presented claims concern only the design of the cooling cell, therefore, no further details of multipurpose box and reservoir are included here.

Figure 2A:
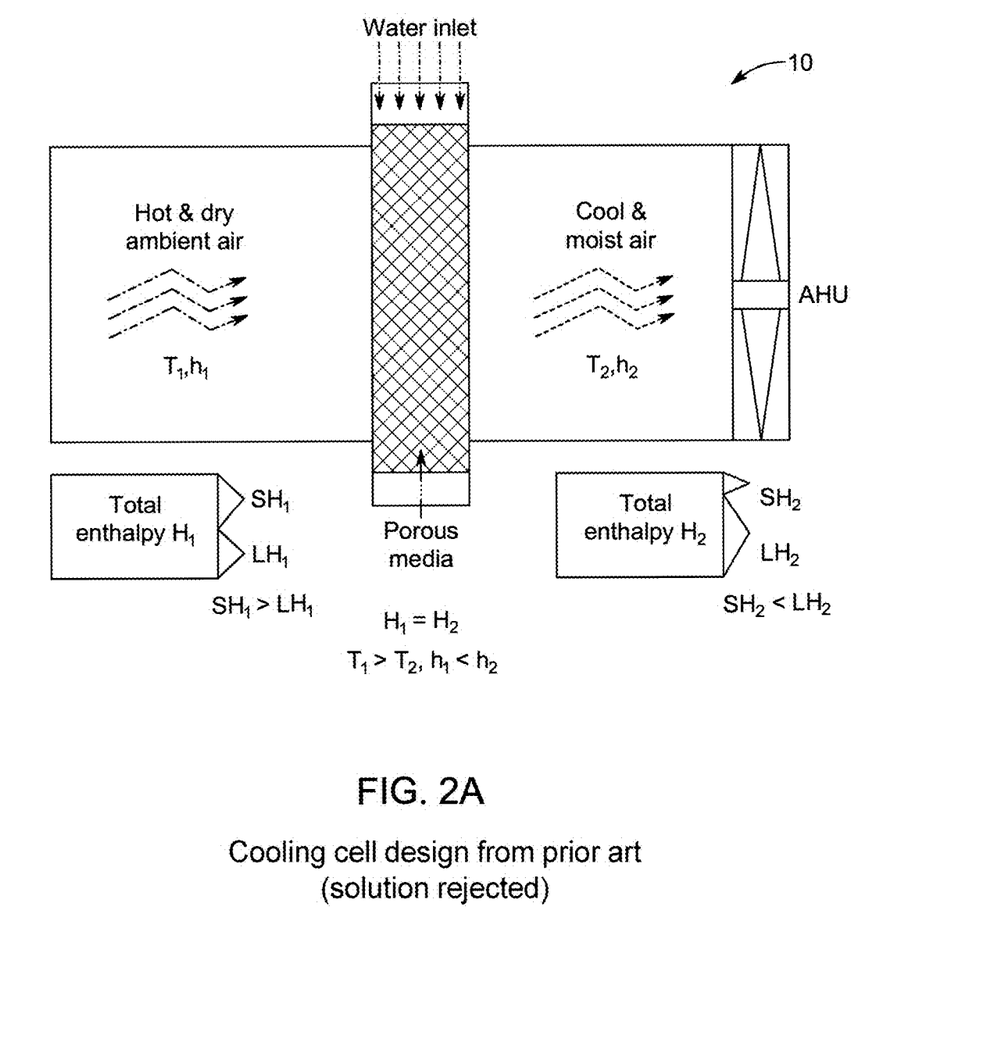
FIG. 2A is an exemplary schematic diagram of a conventional direct evaporative cooling system.

FIG. 2A [Lee, K. H., & Choi, Y. S. (2020). *Experimental investigation of evaporative cooling using porous ceramic plates. Energy Procedia*, 178, 105-112] illustrates a schematic representation of a direct evaporative cooling system 10 showing thermodynamic state transitions and energy flows. The direct evaporative cooling system 10 includes an inlet zone characterized by temperature $T_1$ and humidity $h_1$, where hot and dry ambient air enters with total enthalpy $H_1$. A centrally positioned porous media element, operating as the primary heat and mass transfer interface, facilitates thermal exchange between the incoming airstream and water introduced through multiple water inlet ports positioned at the upper boundary of the media matrix. The direct evaporative cooling system 10 incorporates an Air Handling Unit (AHU) at the outlet zone to regulate airflow parameters of the processed air stream.

The thermodynamic process within the direct evaporative cooling system 10 is characterized by the following state transitions and energy balances: the inlet air at state point 1 ($T_1$, $h_1$) exhibits a higher sensible heat component ($SH_1$) relative to its latent heat component ($LH_1$), where $SH_1 > LH_1$. As the air traverses the porous media, it undergoes simultaneous heat and mass transfer, resulting in outlet conditions at state point 2 ($T_2$, $h_2$) where $T_1 > T_2$ and $h_1 < h_2$. The total enthalpy remains conserved across the process ($H_1 = H_2$) in accordance with the First Law of Thermodynamics, while the sensible-to-latent heat ratio undergoes inversion, yielding $SH_2 < LH_2$ at the outlet. This transformation results in cool, moistened air with temperature $T_2$ and humidity $h_2$, improved for human comfort parameters while maintaining thermodynamic efficiency through the conservation of total system energy. The direct cooling systems have limitations related to economy of water consumption and energy, so not preferred over indirect cooling systems.

Figure 2B:
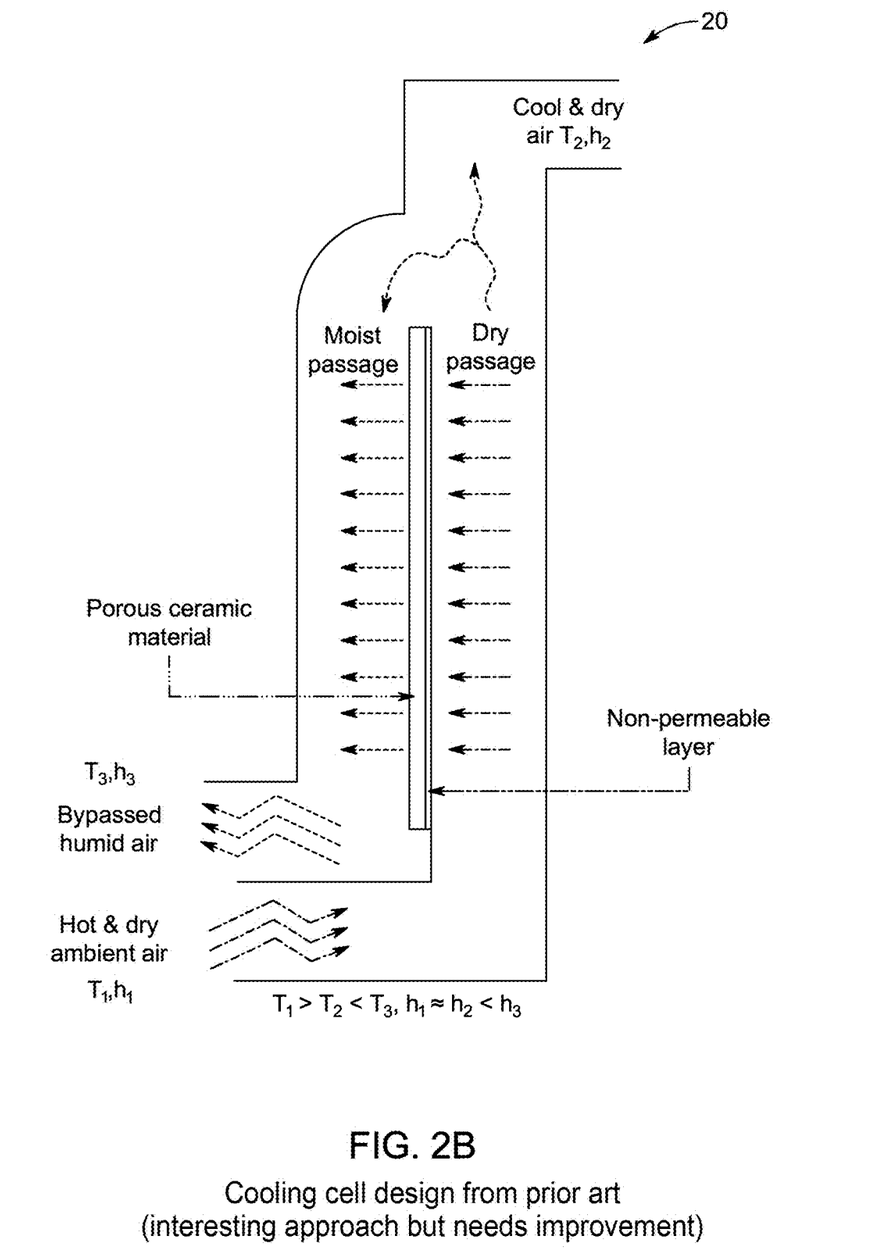
FIG. 2B is an exemplary schematic diagram of a conventional indirect evaporative cooling system.

FIG. 2B [Boukhanouf R., Ibrahim H. G., Alharbi A., Kanzari M., (2014). *Investigation of an Evaporative Cooler for Buildings in Hot and Dry Climates. Journal of Clean Energy Technologies*, Vol. 2, No. 3] illustrates a schematic representation of an Indirect Evaporative Cooling System (IECS) 20 using a Porous Ceramic Evaporative Cooler (PCEC), which implements sub-wet bulb temperature cooling through an advanced IECS architecture. The IECS 20 includes a dual-passage configuration separated by a non-permeable heat conductive metallic layer, with operational parameters defined by temperature and humidity states ($T_1$, $h_1$) for inlet hot and dry ambient air, ($T_2$, $h_2$) for cool and dry outlet air, and ($T_3$, $h_3$) for bypassed humid air, where $T_1 > T_2 < T_3$ and $h_1 \approx h_2 < h_3$. The IECS 20 includes porous ceramic materials, configured in hollow and flat shell geometries, serving as the primary wet media interface for achieving sub-wet bulb temperature conditions.

The material selection criteria prioritize two parameters: (i) porosity, defined as the volume fraction of pores per unit volume, and (ii) wettability, characterized by water absorption capacity of the material. These parameters are engineered within specific ranges to enhance thermal performance while maintaining structural integrity. The ceramic components are fabricated through molding processes, enabling geometric customization to accommodate various system configurations and performance requirements. The non-permeable heat conductive metallic layer, positioned between the dry and moist passages, facilitates controlled heat transfer while preventing direct moisture transmission.

The operational dynamics of the IECS 20 involve a complex interplay between material properties and thermodynamic processes. The porosity-to-strength ratio of the ceramic material represents a design parameter, requiring calculations to balance thermal efficiency with structural durability. Higher porosity values enhance thermal transfer efficiency but need to be constrained within limits that maintain adequate mechanical strength. The material selection process employs criteria including: (a) moldability for geometric flexibility, (b) corrosion resistance for operational longevity, (c) pore structure for enhanced wettability, and (d) balanced mechanical properties for structural integrity. The parallel flow configuration, with distinct dry and moist passages, enables efficient heat exchange while maintaining separation between primary and secondary air streams, thereby improving overall thermal and operational efficiency of the IECS 20. With all these advantages of IECS, there are still some challenges related to: (i) water consumption, (ii) usage for indoor environment only, and (iii) two-sides heat exchange wall. Therefore, it is desirable to search for more efficient and economical solutions which may reduce water and energy consumption, and enhance overall thermal efficiency.

Figure 3:
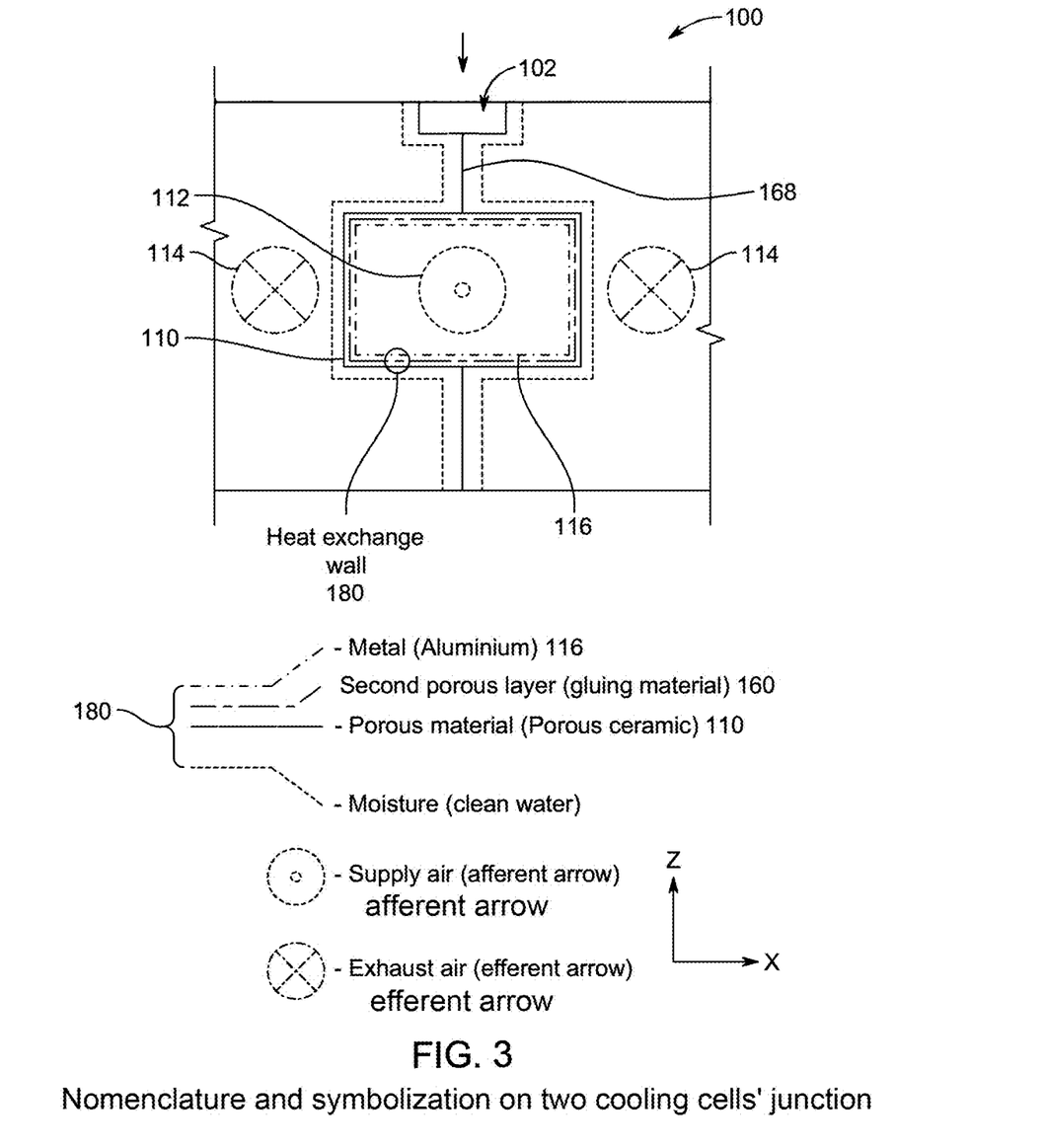
FIG. 3 is an exemplary schematic diagram of a cooling system showing two cells junction configuration, according to certain embodiments.
Figure 4A:
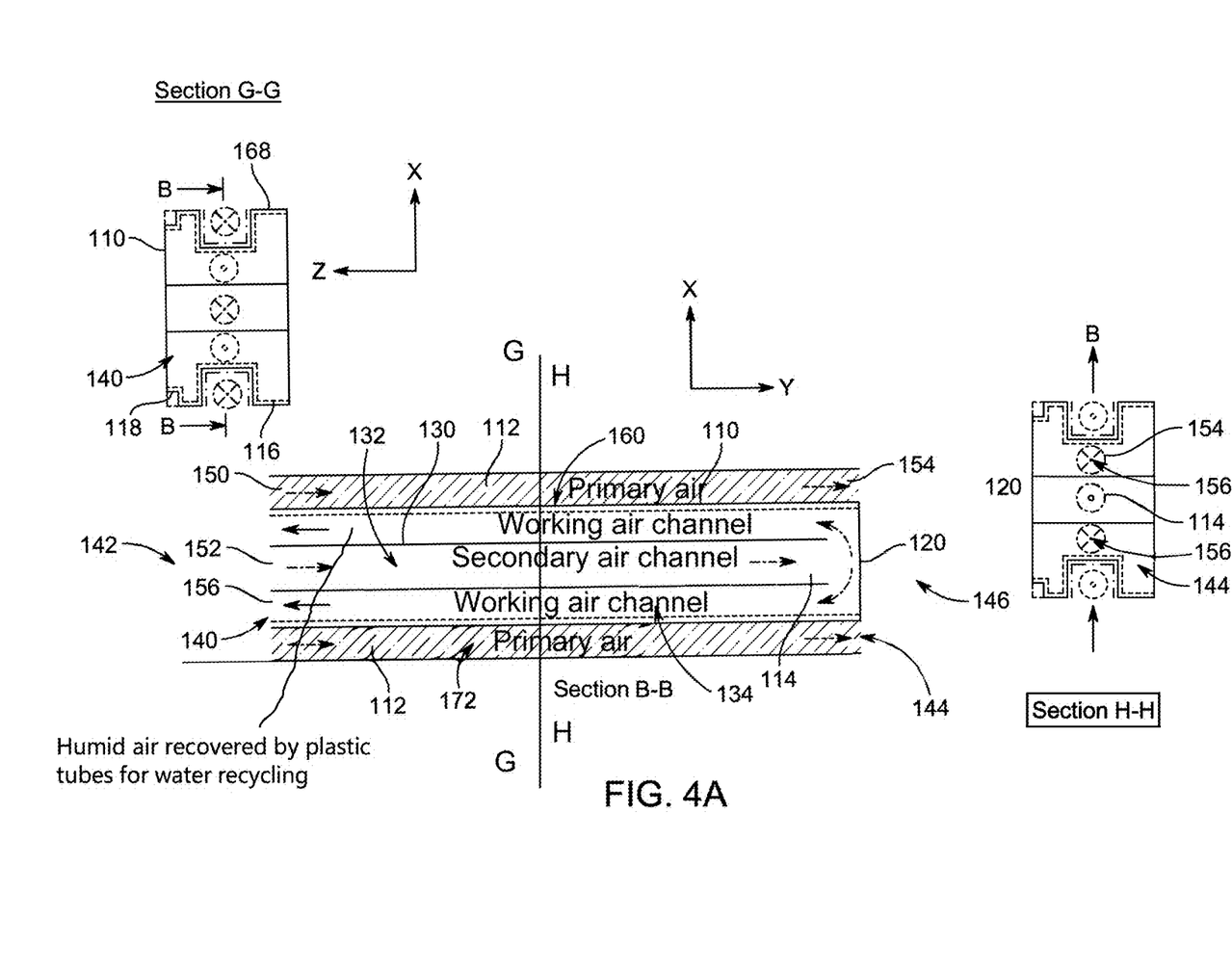
FIG. 4A is an exemplary illustration of the cooling system in a second orientation, orthogonal to the first orientation, with a corresponding sectional view along B-B, according to certain embodiments.
Figure 4B:
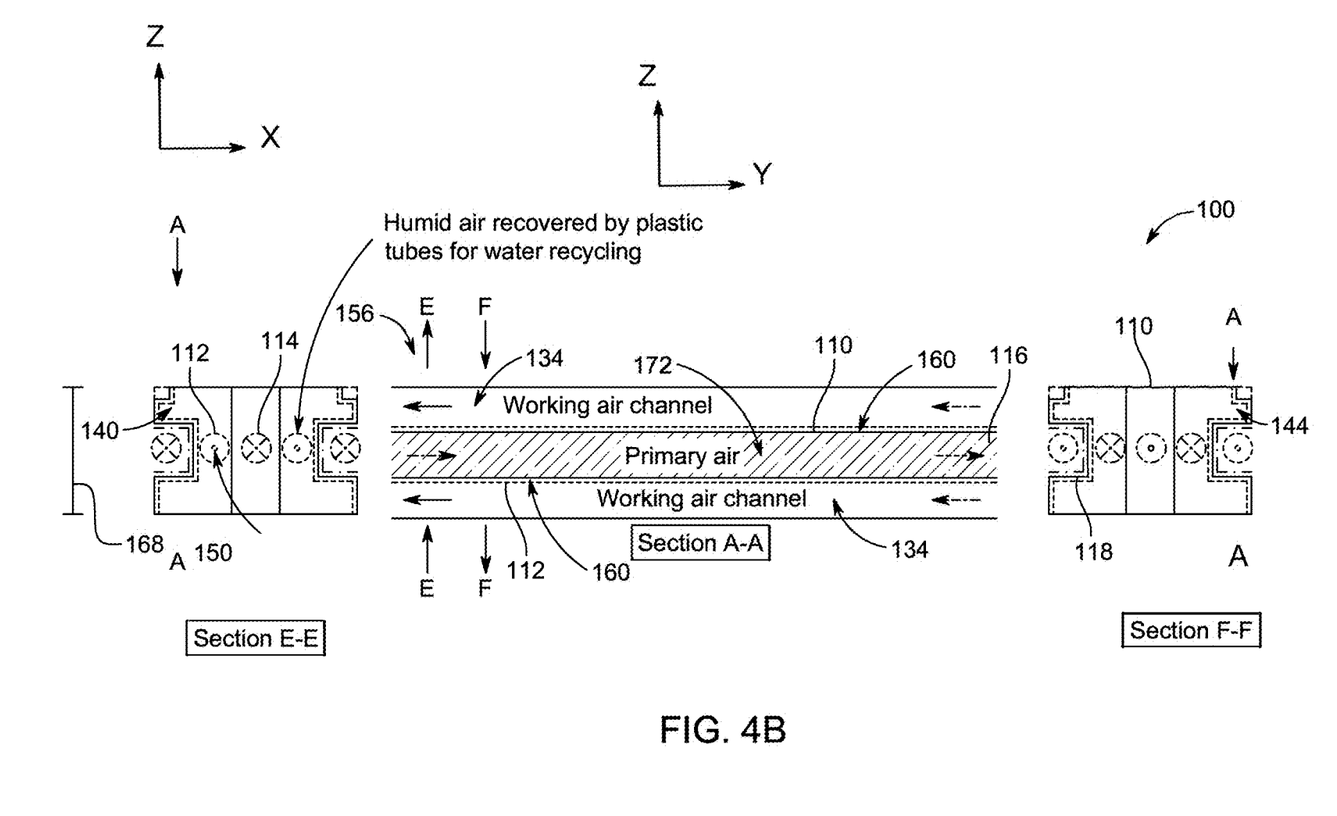
FIG. 4B is an exemplary illustration of the cooling system in a first orientation with a corresponding sectional view along A-A, according to certain embodiments.

Referring to FIG. 3, illustrated is a schematic diagram of a cooling system (as represented by reference numeral 100) as per embodiments of the present disclosure. Further, FIGS. 4A and 4B illustrate sectional views of the cooling system 100, showing parallel arrangement of various channels therein. The cooling system 100 of the present disclosure includes a four-sided heat exchange design and is also referred to as Four Sides Sub-Wet Bulb Cell (4SSBC) heat exchanger. In the cooling system 100 of the present disclosure, operating parameters are controlled to maintain thermally comfort conditions while ensuring efficient water utilization and energy consumption. The cooling system 100 demonstrates adaptability to varying environmental conditions, capable of maintaining consistent performance across a wide range of ambient temperatures (e.g. 30-45° C.) and relative humidity levels (e.g. 10-70%). Through integration of multiple cooling cells, the system achieves temperature reductions of 5-15° C. or any values therebetween) while maintaining relative humidity. The design approach for the cooling system 100 incorporates considerations for long-term durability, maintenance accessibility, and operational reliability, resulting in a sustainable solution for outdoor climate control with practical functionality. Furthermore, the modular architecture of the cooling system 100 enables scalability and customization to accommodate diverse installation requirements and capacity needs, ranging from small recreational areas to large public spaces.

As illustrated in FIGS. 3 and 4A-4B in combination, the cooling system 100 includes a heat exchange wall 110 separating a primary air channel 112 (also referred to as a dry cooling passage 172) and a secondary air channel 114 that are arranged in parallel. Specifically, the heat exchange wall 110 provides thermal exchange and physical separation between the primary air channel 112 and the secondary air channel 114 arranged in a parallel configuration. The heat exchange wall 110 is configured to facilitate heat transfer between the primary air channel 112 and the working air channel 134 while maintaining physical separation between their respective airflows. In the illustration of FIG. 3, the primary air channel 112 includes the space enclosed by a first thermally conductive layer 116 and is partially marked by the region as "Supply air" while the working air channel 134 incorporates the space defined by the heat exchange wall 110 and is partially marked by the region as "Exhaust Working air" In other words, each circular representation, as shown in FIGS. 3 to 6, (with a cross—efferent arrow or dot—afferent arrow therein and thereafter) in the drawings of the present disclosure does not represent an actual physical structure, but is merely used to illustrate air flow. The parallel arrangement of the primary air channel 112, working air channel 134, and the secondary air channel 114 is shown through the structural configuration illustrated in both the top view and cross-sectional representations of FIGS. 4A and 4B.

In an embodiment, the heat exchange wall 180 includes the first thermally conductive layer 116 including a metal and a second porous layer (for gluing conductive metal layer with structural ceramic 110)160 including at least one porous material. The first thermally conductive metal layer 116 faces the primary air channel 112 while the second porous layer 160 faces the working air channel 114. The first thermally conductive metal layer 116 can have a thickness of 0.5-3 mm. The second porous layer 160 can have a thickness of 0-3.0 to 5.0 mm. This layered structure of the heat exchange wall 180 maintains consistent thermal and structural properties across an interface between the primary air channel 112 and the working air channel 134.

The composition of the metal material for the first thermally conductive layer 116 of the heat exchange wall 180 may vary depending on the specific design requirements for the cooling system 100. Herein, the first thermally conductive metal layer 116 can include aluminum or stainless steel or copper alloys. However, metals like aluminum or copper are often used due to their high thermal conductivity and less cost. Since the cooling system 100 involves the circulation of water (as discussed later), the heat exchange wall 180 may be constructed using materials that are resistant to corrosion, such as stainless steel or coated metals, to ensure durability and longevity of the cooling system 100. Aluminum may be used for covering porous materials due to its excellent thermal conductivity, lightweight nature, and resistance to corrosion. Aluminum also allows for efficient heat transfer while providing durability and longevity to the cooling system 100. Other metals such as stainless steel may also be used, especially in applications where enhanced corrosion resistance is required or in environments with harsh operating conditions.

Further, the choice of material for the second porous layer 160, for gluing metal layer 116 with the structural ceramic 110, of the heat exchange wall 180 depends on factors such as design, operating conditions, efficiency requirements, and maintenance considerations for the cooling system 100. Herein, the second porous layer 160 includes at least one porous material selected from the group consisting of cellulose, polymer, or ceramic. Cellulose pads or panels may be used as the porous material in cooling system 100 due to their high absorbency and efficient heat and mass transfer properties. These media are specifically designed to provide a large surface area for evaporation while maintaining structural integrity. Synthetic materials such as specially designed polymer fibers or foams can also be used as porous media in the cooling system 100. These materials offer durability, resistance to microbial growth, and customizable properties for enhanced heat and mass transfer. Structural ceramic 110, such as ceramic honeycombs or bricks, or tiles, can be utilized in certain designs of the cooling system 100. These materials offer high thermal stability and resistance to chemical degradation, making them suitable for harsh operating conditions.

In present embodiments, the conductive metal layer 116 in heat exchange wall 180 is impermeable to air and moisture. The first thermally conductive layer 116 creates a complete barrier that prevents molecular transfer between the primary air channel 112 and the working air channel 114, while maintaining thermal conductivity. The cooling system 100 further includes a plate 120 positioned on an end of the heat exchange wall 180, as shown in the sectional views of FIGS. 4A and 4B. The plate 120 includes a rigid structural member configured to provide both mechanical support and flow direction control for the cooling system 100. The plate 120 extends across the entire cross-sectional area of the cooling system 100, interfacing with both the working air channel 134 and the secondary air channel 114 at their respective endpoints. In the illustration of FIGS. 4A and 4B, section A-A and section B-B show the positioning of the plate 120 relative to the heat exchange wall 180. The plate 120 is designed to dimensionally match the cross-sectional profile of the cooling system 100, with tolerances maintained at interfaces with the heat exchange wall 180. The plate 120 may including a layer of plastics selected for their thermal insulating properties and facing the air flows and a layer of metallic materials selected for their durability and structural properties and facing away from the air flows. Further, the plate 120 is designed with a surface finish to reduce flow resistance and ensure proper sealing at all interfaces. The plate 120 is preferably cast with the structural ceramic 110, however; its manufacturing could be difficult and may increase the cost of cooling system 100.

The cooling system 100 further includes a partition wall 130 positioned in between secondary air channel 114 and working air channel 134, arranged in parallel and not connected with the plate 120, as shown in FIG. 4A. The partition wall 130 extends longitudinally and provide a passage for air to flow from the secondary air channel 114 to the working air channel 134, as better illustrated in section B-B of FIG. 4A.

The cooling system 100 further includes a first side 140 fluidly connected to a first space 142 and a second side 144 fluidly connected to a second space 146, as shown in FIGS. 0A and 0B. For example, the first space 142 can be configured as an outdoor space containing primary (ambient) air coming through fan, as illustrated in FIG. 1A, while the second space 146 configured as an indoor space intended to receive cooled air. Herein, the primary air channel 112 and the secondary air channel 114 both include primary (ambient) air from the outdoor space. The fluid connection between the first side 140 and the first space 142 enables intake of ambient air for both the primary air channel 112 and the secondary air channel 114. Further, the fluid connection between the second side 144 and the second space 146 facilitates delivery of cooled air to the indoor environment.

Herein, the plate 120 is positioned at the second side 144 of the cooling system 100, as illustrated in the sectional view of FIG. 4A. This positioning of plate 120 enables the transition of flow direction, exactly opposite, of air from secondary air channel 114 to the working air channel 134. Further, the partition wall 130 extends longitudinally from the first side 140 towards the second side 144 and is spaced apart from the plate 120, as shown in section B-B of FIG. 4A. Such spacing between the partition wall 130 and the plate 120 creates a flow transition zone that enables air movement from secondary air channel 114 to the working air channel 134. Further, the extension of the partition wall 130 from the first side 140 ensures proper flow separation along the length of the cooling system 100 while enabling necessary flow mixing near the plate 120.

The cooling system 100 further includes a primary air inlet 150 positioned on the first side 140 and configured to receive a primary air from the first space 142, and a secondary air inlet 152 positioned on the first side 140 of cooling system 100 and configured to receive a secondary air from the first space 142, as shown in FIG. 4A. The primary air inlet 150 and the secondary air inlet 152 may incorporate flow conditioning features to ensure uniform distribution of air as it enters the respective channel 112, 114. Herein, the heat exchange wall 180 is configured to receive water from moisting channel 102, as shown in FIG. 3, for the working air to generate evaporative cooling for the primary air and to form a cooled air. This heat exchange transforms secondary air into working air containing moisture. For this purpose, the heat exchange wall 180 includes water delivery mechanisms to receive water for interaction with the working air. The water delivery to heat exchange wall 180 is managed through a moistening channel 102 (shown in FIG. 3).

Figure 1B:
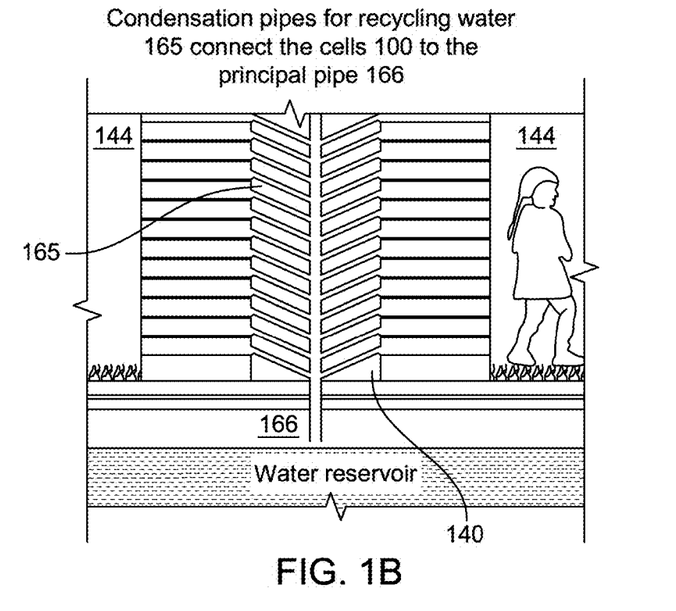
FIG. 1B is an exemplary schematic diagram of a magnified version of cooling structure showing the water condensation mechanism

The cooling system 100 further includes a primary air outlet 154 positioned on the second side 144 and configured to discharge the cooled air into the second space 146. While working (wet) air outlet 156 positioned on the first side 140 and configured to discharge it in water condensation pipes located in the first space 142, as shown in FIG. 1B. The flow path from primary air inlet 150 to primary air outlet 154 maintains continuous thermal exchange contact with the heat exchange wall 180. The positioning of working air outlet 156 on the first side 140 enables efficient removal of moisture-laden working air while maintaining the thermal partition by the first side plate 182 that separates the cooling cell 100 from the first space 142.

In the cooling system 100, the partition wall 130 defines a boundary between secondary air flow channel and working air channel 134. As illustrated in FIG. 4A, the partition wall 130 defines the secondary air flow path along the working air channel 134 from the first side 140 to the second side 144 and then along the working air channel 134 from the second side 144 to the first side 140. This secondary air flows through two sequential stages: first longitudinally along the secondary air channel 114 from the first side 140 to the second side 144, and subsequently returning along the working air channel 134 from the second side 144 back to the first side 140. This bi-directional flow arrangement is illustrated in section B-B of FIG. 4A, where directional arrows indicate the prescribed flow pattern within the secondary and working air channels 114 and 134, respectively.

Further, in the cooling system 100, the working (wet) air channel 134 is structurally positioned between the heat exchange wall 180 and the partition wall 130, as detailed in the cross-sectional views of FIGS. 4A and 4B. In FIG. 4B section F-F, the geometrical arrangement creates two zones within the cooling system 100, i.e., the primary air channel 112 bounded (180 degrees for single cell) by the heat exchange wall 180 from one side, and it is also surrounded (180 degrees for single cell) by the working air channel 134 from the other side. The positioning of the working air (wet) channel 134 adjacent to the heat exchange wall 180 facilitates working air to have thermal exchange (absorbing energy and getting humidified) with primary air. This arrangement improves the thermal efficiency by maintaining continuous contact between the working (wet) air channel 134 and the heat exchange wall 180 along the flow path.

According to embodiments of the present disclosure, in the cooling system 100, the primary air channel 112 is surrounded 360 degrees (in case of two adjacent cells) by the heat exchange wall 180 which is surrounded by the working air channel 134 by approximately 350 degrees due to the junction of two adjacent cells, as shown in FIG. 3. This circumferential arrangement of the Four Sides Sub-Wet Bulb Cell (4SSBC) represents a novel advancement over conventional two-sided or partial-surround configurations in the field of indirect evaporative cooling. As illustrated in FIGS. 3 and 4A-4B, the primary air channel 112 is fully encased by the heat exchange wall 180, increasing the available surface area for heat transfer. The surrounding working air channel 134 extends around the heat exchange wall 180 with nearly complete circumferential coverage, which may be interrupted only by essential structural supports maintaining mechanical integrity of the assembly and/or the moistening channel 102. The complete circumferential coverage enhances the effective heat transfer area per unit length of the cooling system 100, enabling enhanced thermal exchange efficiency compared to conventional planar or partial-surrounded configurations.

In general, the thermal dynamics of the proposed 360 degrees arrangement of layers in the cooling system 100 of the present disclosure facilitates uniform temperature distribution and consistent cooling performance. The complete surrounding of the primary air channel 112 by the heat exchange wall 180 ensures that the primary air maintains constant thermal contact along its flow path. Similarly, the surrounding of the heat exchange wall 180 by the working (wet) air channel 134 ensures evaporative cooling effect around the entire circumference of the heat exchange surface. This geometric arrangement eliminates thermal dead zones and flow discontinuities commonly encountered in conventional heat exchanger designs.

Figure 5:
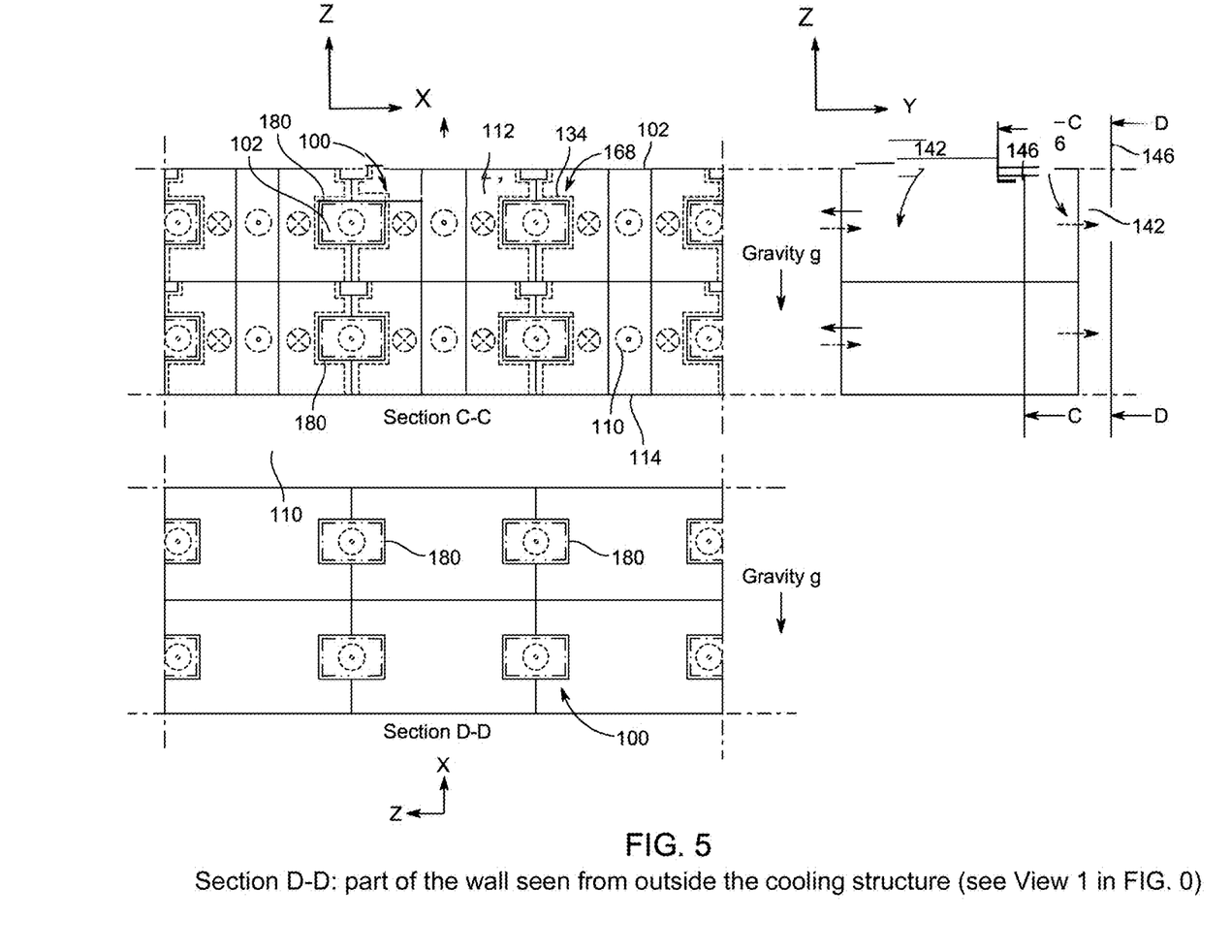
FIG. 5 is an exemplary illustration of vertical stacking arrangement of multiple cooling cells in section C-C and view D-D thereof, according to certain embodiments.

According to present disclosure embodiments, the cooling system 100 includes a plurality of heat exchange walls 180 surrounded 360 degrees by the working air channel 134. That is, each heat exchange wall 180 is surrounded 360 degrees by a corresponding working air channel 134. As may be contemplated from the structural arrangement shown in FIG. 5, specifically in sections C-C and view D-D, multiple heat exchange walls 180 are arranged in a grid pattern to form an integrated cooling matrix. It is noted that view D-D represents view 2 in FIG. 1A. Each heat exchange wall 180 defines a respective primary air channel 112 that is surrounded 360 degrees by the corresponding working (wet) air channel 134, since moistening channel 102 and a divider wall 168 are hidden in view D-D, which are physically located behind the plate 120. As a thickness of the divider wall 168 is almost negligible in the XZ cross-sectional view in view D-D, each primary air channel 112 can be effectively considered to be surrounded 360 degrees by the corresponding working air channel 134. Each of the primary air channels 112 maintains complete circumferential thermal contact with its associated heat exchange wall 180. This arrangement is replicated across multiple cells to create a cooling array, as illustrated in FIG. 5. This configuration enables scalable cooling capacity through parallel operation of multiple thermal exchange cells while maintaining the proposed 360 degrees surrounding geometry for each individual heat exchange wall 180.

Figure 6:
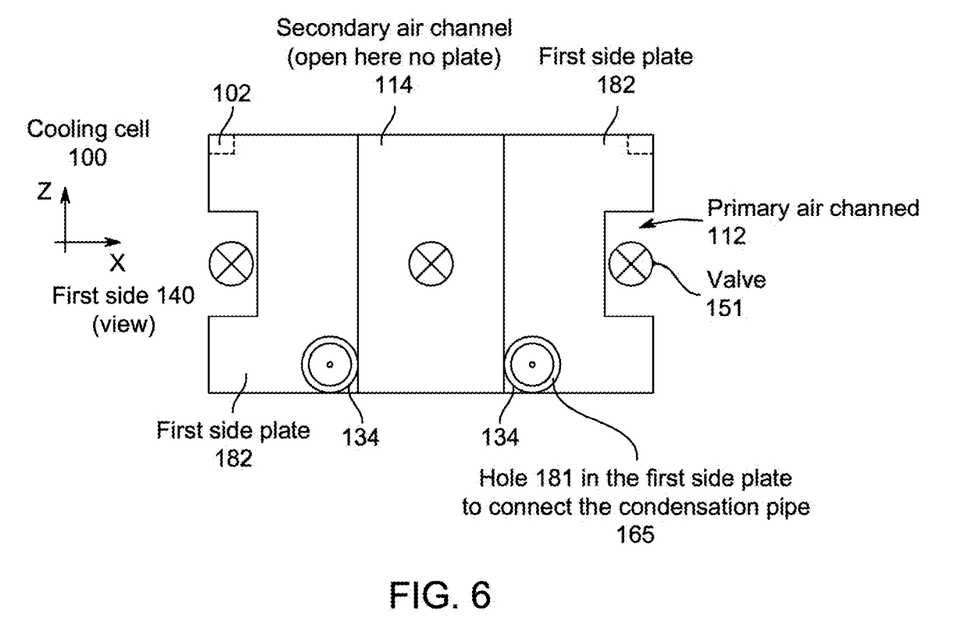
FIG. 6 is an exemplary operational view of the cooling cell showing an open secondary air channel and the first side plate covering the working air channel therein, according to certain embodiments.

In the present embodiment, the cooling system 100 may incorporate multiple primary air channels, each surrounded 360 degrees by one working air channel. As shown in FIG. 6 and the XY cross-sectional view in FIG. 4A, the cooling system 100 includes a respective primary air inlet 150, for each primary air channel 112, positioned on the first side 140 and configured to receive a primary air from the first space 142. Herein, each primary air channel 112 maintains dedicated flow paths through dry cooling passage. As shown in FIG. 6 and the XY cross-sectional view in FIG. 4A, the cooling system 100 includes a respective primary air outlet 154, for each primary air channel 112, positioned on the second side 144 and configured to discharge the cooled air into the second space 146. Herein, the plate 120 incorporates openings for each primary air outlet 154. The spatial distribution of the primary air outlets 154 maintains flow separation while ensuring cooling delivery to the second space 146. The integration of dedicated inlet-outlet pairs for each primary air channel 112 enables flow control and thermal management within the cooling system 100. As may be understood from FIG. 6 and the XY cross-sectional view in FIG. 4A, each primary air undergoes thermal conditioning as it traverses from the respective inlet to the respective outlet, maintaining continuous thermal contact with the heat exchange wall 180 through the 360 degrees surrounding configuration. In other words, a plurality of primary air channels 112 can be surrounded 360 degrees by the working (wet) air channel 134. A plurality of heat exchange walls 180 can be positioned between two neighboring partition walls 130.

The cooling system 100 may further include valve (e.g. 151) positioned on the first side plate 182 and each configured to open and close a respective primary air inlet 150. The cooling system 100 incorporates a series of control valves 151 positioned on the first side plate 182 on the second side 1404, with each valve configured to regulate flow through its corresponding primary air inlet 150. Each valve implements flow control mechanisms to modulate the discharge of cooled air into the second space 146. The valve configuration enables independent control of flow path for each primary air channel 112. As a result, the degree of cooling can be adjusted by the degree and the number of opened valves (e.g. 151). In the example of FIG. 6, the control valves 151 are closed and overlap with the primary air inlets 150.

In the present configuration, the plurality of the heat exchange walls 180 each is removably attached to the plate 120. The mechanical interface between each heat exchange wall 180 and the plate 120 incorporates specific design features enabling removable attachment. The attachment mechanism may utilize mounting brackets and fastening elements to secure each heat exchange wall 180 to the plate 120 while maintaining the capability for removal and replacement. For example, the plurality of the heat exchange walls 180 can each have a shape of a cylindrical pipe, having one end removably attached to the plate 120 on the first side 140 and another end removably attached to the plate 120 on the second side 144. As a result, the degree of cooling can be adjusted by the number of the heat exchange walls 180.

In some embodiments, the cooling system 100 also includes a porous silica gel layer 160 directly adjacent to and continuous with the working (wet) air channel 134. That is, the silica gel layer 160 is integrated directly adjacent to and maintains continuous contact with the working (wet) air channel 134. As illustrated in FIGS. 4A and 4B, the silica gel layer 160 extends continuously along the working (wet) air channel 134, providing consistent moisture management capabilities throughout the operational cycle. The direct adjacency between the silica gel layer 160 and the working (wet) air channel 134 facilitates efficient moisture management within the working air channel 134. Herein, the silica gel layer 160 functions as a water absorption and evaporation buffer layer. During normal operation, the silica gel layer is saturated with water. If the supply of moisture or water to the working (wet) air channel 134 is interrupted, the silica gel layer 160 provides an evaporative moisture buffer that avoids abrupt temperature changes in cold dry air. The silica gel layer 160 is preferably continuous along the wall of the working (wet) air channel 134 and has a thickness of 1.0-3.0 mm, or any value therebetween. In one embodiment, the silica gel layer 160 is positioned between the first thermally conductive metal layer 116 and the structural ceramic layer 110 and is in direct contact with the working air flow via pores of the structural ceramic layer 110. The main objectives of using silica gel layer 160 are: (i) provide adhesive layer between thermally conductive metal layer 116 and structural ceramic 110, (ii) assure the porous continuity in order to transport moisture from structural ceramic 110 to the thermally conductive metal layer 116.

In some embodiments, the silica gel layer 160 may also includes a continuous moisture-permeable polymer membrane layer and silica gel particles in particulate form. In an example, the moisture-permeable polymer membrane layer may be a layer of a water-permeable polymer, that functions as a matrix or permeable covering layer to contain the (particulate) silica gel particles. Herein, the particulate silica gel particles have an average particle size of 10-500,000 nm or any values therebetween. The continuous moisture-permeable polymer membrane layer has an average pore dimension of 10-500,000 nm or any values therebetween. The continuous moisture-permeable polymer membrane layer maintains selective permeability characteristics, allowing controlled moisture transfer while preventing particle migration. Such composite structure of particulate silica gel with the moisture-permeable polymer membrane layer ensures sustained performance while maintaining structural integrity of the assembly.

The cooling system 100 further includes fan 185, as shown in FIG. 1A, to deliver the primary air to the primary air inlet 150 and deliver the secondary air to the secondary air inlet 152. The fan 185 is configured to generate specific flow rates and pressure differentials required for operation of the cooling system 100. The flow delivery mechanism, using the fan 185, maintains controlled, using valves, primary air flow entering through the primary air inlet 150 into the primary air channel 112, while independently managing the secondary air flow through the secondary air inlet 152 into the secondary air channel 114. The operational parameters of fan 185 may vary depending on specific design needs.

The cooling system 100 may further include a water supply mechanism positioned above the primary channel 112 and configured to supply water to the structural ceramic 110 through the moisting channel 102. The water supply mechanism may incorporate nozzles designed to achieve uniform water distribution across the surface area of structural ceramic 110. The positioning of the water supply mechanism enables direct water application to facilitate the evaporative cooling process along the thermal exchange interface. The water supply mechanism provides uniform wetting on each primary air channel 112. The integration of the water supply mechanism ensures efficient water utilization and sustained cooling performance through control of water distribution parameters. It is noted that the design of water supply mechanism, use to provide water for moisting channels 102, is not the part of present disclosure.

The cooling system 100 may further include a water condensation pipe 166 (generally represented in FIG. 1B) configured to collect moisture from the exhaust working (wet) air via at least one exhaust pipe 165. The water condensation pipe 166 operates as a moisture recovery subsystem within the cooling system 100, implementing controlled condensation processes to extract water vapor from the moisture-laden exhaust working (wet) air exiting the working (wet) air channel 134. The condensation process occurs through temperature gradients maintained within the water condensation pipe 166, enabling efficient moisture extraction and collection. The positioning of the water condensation pipe 166 enables gravity-assisted collection of condensed moisture while maintaining proper air flow characteristics. For example, the water condensation pipe 166 is located below the working (wet) air channel 134 to avoid blocking air inlets and outlets (e.g. 150, 152, 154 and 156). At least one exhaust pipe 165 can direct the exhaust working air and moisture at least partially by gravity. In some examples, the water condensation pipe 166 may integrate drainage channels for collected water management; and heat exchange mechanisms for maintaining condensation temperature. The collected moisture is subsequently available for recirculation through the water supply mechanism, enabling a closed-loop water management cycle within the cooling system 100. This may enhance water consumption efficiency and ultimately for the whole cooling system 100.

The moistening channel 102 is configured to provide water along the divider wall 168 and the heat exchange wall 180. The moistening channel 102 implements flow control mechanisms to maintain water distribution for the evaporative cooling process. The geometric configuration of the water supply mechanism ensures uniform water delivery along the length of the thermal exchange interface, with specific flow characteristics.

In the present configuration of the cooling system 100, when viewed from the first side 140 (perpendicular to XZ-plane in FIG. 6) towards the second side 144, there are two circular holes, located at the bottom of each cell, in the first side plate 182, as shown in FIG. 6. At the first side, the primary and secondary air channels stay open to receive air from the fan 185, as shown in FIG. 6. Herein, each heat exchange wall 180 in the plurality of heat exchange walls exhibits one-half square cross-sectional shape at the extreme end of each cell to improve surface area contact with surrounding flows. This geometric configuration is generally illustrated in section C-C and view D-D of FIG. 5, where each heat exchange wall 180 maintains square symmetry around the primary air channel 112. Further, as shown in section C-C, the working (wet) air channel 134 has U-shape around primary air channel 112 to improve flow distribution and thermal exchange efficiency, however; the secondary air channel 114 maintain rectangular cross-sectional shape . . . . Further, when viewed from the first side 140 towards the second side 144, the primary air channel 172 (or 112) has a square shape having four sides surrounded by the working (wet) air channel 134. Of course, the shapes of the components are discussed above merely for illustrative purposes and are not particularly limiting. For example, when viewed from the first side 140 towards the second side 144, the primary cooling air channel 172 (or 112) can have a rectangular shape, a circular shape, a hexagonal shape or any other shape.

The cooling system 100 implements the four-sided heat exchange process through the 360-degree configuration of the heat exchange wall 180 around the primary air channel 112. This geometric arrangement surpasses conventional two-sided heat exchange configurations in thermal transfer efficiency. The heat exchange wall 180 incorporates porous materials including ceramics and/or synthetic media to improve heat and mass transfer characteristics. While conventional Indirect Evaporative Cooling (IEC) systems implement two heat exchanging sides, the cooling system 100 enhances thermal exchange efficiency through a four-sided configuration. The cooling system 100 achieves fresh air production with reduced water consumption through implementation of the 360-degree heat exchange wall 180 surrounding the primary air cooling channel 112 (or 172).

Multiple cooling systems 100 are configured in arrays (as illustrated in FIG. 5), creating distributed cooling zones in outdoor recreational spaces. The primary air channel 112 and the secondary air channel 114 maintain flow control to deliver cooled air with controlled humidity levels. The water management subsystems, including water supply mechanism and the water condensation pipe 166, reduce water consumption while maintaining cooling performance. The modular architecture of cooling system 100 enables integration into decorative structural elements while maintaining high thermal performance. As shown in FIG. 5, multiple cooling systems 100 are arranged in cell configurations to create scalable cooling capacity. Each cooling system 100 maintains independent flow control through dedicated primary air inlets and outlets while sharing common support infrastructure. This modular approach enables flexible deployment across various outdoor recreational installations while maintaining consistent cooling performance parameters.

As shown in FIG. 5, the cooling cells are mounted vertically and stacked on top of each other to form an integrated cooling wall structure. Each cooling system 100 maintains independent operation while contributing to the overall cooling capacity of the assembled structure. The modular design enables systematic capacity scaling through addition or reduction of cooling system 100 units within the vertical stack, while maintaining consistent performance parameters across different operational units.

In some embodiments, the cooling system 100 of the present disclosure is configured for implementation in urban environments characterized by elevated temperatures between 30-45 degrees Celsius and relative humidity levels below 10-70%. The cooling system 100 addresses thermal management requirements in outdoor recreational spaces where conventional air conditioning solutions may be impractical or inefficient. During evening hours when outdoor activity increases, the cooling system 100 creates localized zones of thermal comfort within public gathering areas, as illustrated in FIG. 1A. The cooling system 100 integrates structural and functional aspects to serve as modular units within decorative architectural installations.

The invention claimed is:

1. A cooling system, comprising:
  a heat exchange wall separating a primary air channel and a secondary air channel that are arranged in parallel;
  a plate positioned on an end of the heat exchange wall, wherein valves are positioned on the plate and each valve is configured to open and close a respective primary air inlet; and
  a partition wall separates the secondary air channel and working (wet) air channel that are arranged in parallel and connected at the plate,
  a first side fluidly connected to a first space and a second side fluidly connected to a second space, wherein the plate is positioned at the second side, and the partition wall extends from the first side towards the second side and is spaced apart from the plate;
  a silica gel layer directly adjacent to and continuous with the working air channel, the partition wall defines the secondary air channel along the working air channel from the first side to the second side and then along the working (wet) channel from the second side to the first side, the working (wet) air channel is positioned between the heat exchange wall and the partition wall, and the silica gel layer comprises a silica gel in particulate form and a continuous moisture-permeable polymer membrane layer on an outside surface of the silica gel layer;
  wherein a plurality of the heat exchange walls is surrounded 360 degrees by the working (wet) air channel, and the plurality of the heat exchange walls each define a respective primary air channel surrounded 360 degrees by the working air channel;
  a respective primary air inlet, for each primary air channel, positioned on the first side and configured to receive a primary air from the first space; and
  a respective primary air outlet, for each primary air channel, positioned on the second side and configured to discharge the cooled primary air into the second space;

wherein the primary air channel is surrounded 360 degrees by the heat exchange wall which is surrounded by the working air channel by more than 350 degrees.

2. The cooling system of claim 1, wherein:
the plurality of the heat exchange walls each is removably attached to the plate.

3. The cooling system of claim 2, further comprising:
a secondary air inlet positioned on the first side and configured to receive a secondary air from the first space, wherein the heat exchange wall is configured to receive water for the working air to generate evaporative cooling for the primary air and to form a cooled primary air and an exhaust working air containing moisture; and
a working air outlet positioned on the first side and configured to discharge the exhaust working air into the first space.

4. The cooling system of claim 3, wherein:
the first space is an outdoor space,
the second space is an indoor space, and
the primary air and the secondary air both include ambient air from the outdoor space.

5. The cooling system of claim 3, further comprising:
an air fan configured to deliver the primary air to the primary air inlet and deliver the secondary air to the secondary air inlet.

6. The cooling system of claim 3, further comprising:
a water condensation pipe configured to collect the moisture from the exhaust working air.

7. The cooling system of claim 1, further comprising:
a water supply mechanism positioned on a moisting channel and configured to supply water to a structural ceramic cell.

8. The cooling system of claim 1, wherein:
when viewed from the first side towards the second side, the plurality of the heat exchange walls each has a square shape, the wet passage has U-shape for each cell (for two adjacent cells, the wet passage surrounds completely the primary air channel)and the working air channel has a rectangular shape.

9. The cooling system of claim 1, further comprising:
a primary air inlet positioned on the first side and configured to receive a primary air from the first space;
a secondary air inlet positioned on the first side and configured to receive a secondary air from the first space, wherein the heat exchange wall is configured to receive water for the working air to generate evaporative cooling for the primary air and to form a cooled primary air and an exhaust working air containing moisture;
a primary air outlet positioned on the second side and configured to discharge the cooled primary air into the second space; and
a working air outlet positioned on the first side and configured to discharge the exhaust working (wet) air into the water condensation pipes.

10. The cooling system of claim 9, wherein:
the heat exchange wall is surrounded 360 degrees by the working (wet) air channel.

11. The cooling system of claim 9, wherein:
when viewed from the first side towards the second side, the dry cooling passage has a square shape having four sides surrounded by the working air channel.

12. The cooling system of claim 1, wherein:
the heat exchange wall is impermeable to air and moisture.

13. The cooling system of claim 12, wherein:
the heat exchange wall includes a first thermally conductive layer comprising a metal and a second porous layer including at least one porous material selected from the group consisting of cellulose, a polymer and a ceramic,
the first thermally conductive layer faces the primary air channel, and
the second porous layer is in between the metal and the ceramic.

14. The cooling system of claim 1, further comprising:
a divider wall separating the air flow paths of primary air and working air,
wherein when viewed from the first side towards the second side, the dry cooling passage is surrounded by the working air channel by more than 350 degrees, and the dry cooling passage is surrounded by the working air channel and the divider wall by 360 degrees.

15. The cooling system of claim 14, further comprising:
a water supply channel configured to provide water to a cooling cell.

* * * * *